United States Patent [19]

Kohsaka et al.

[11] Patent Number: 5,396,792
[45] Date of Patent: Mar. 14, 1995

[54] APPARATUS AND METHOD OF CONTROLLING A ROBOT TO AUTOMATICALLY SIMULATE DRIVING OF A MOTORCAR

[75] Inventors: Hiroji Kohsaka, Kusatsu; Shinji Noguchi, Kyoto, both of Japan

[73] Assignee: Horiba, Ltd., Japan

[21] Appl. No.: 58,416

[22] Filed: May 7, 1993

[30] Foreign Application Priority Data

May 9, 1992 [JP] Japan .................. 4-143232

[51] Int. Cl.⁶ .................... G01M 15/00; G01M 19/00
[52] U.S. Cl. ...................................................... 73/117
[58] Field of Search .................. 73/117, 125, 865.6, 73/865.9

[56] References Cited

U.S. PATENT DOCUMENTS

| | | | |
|---|---|---|---|
| 3,050,994 | 8/1962 | Heigl et al. | 73/117 |
| 3,333,463 | 8/1967 | Hollinghurst | 73/117 |
| 3,363,455 | 1/1968 | Vanderbilt | 73/117 |
| 3,465,578 | 9/1969 | Douglas | 73/117 |
| 4,656,576 | 4/1987 | Kawarabayashi | 73/117 |
| 4,960,008 | 10/1990 | Yen et al. | 73/117 |
| 5,193,062 | 3/1993 | Murase et al. | 73/117 |
| 5,195,038 | 3/1993 | Yagi et al. | 73/117 |

Primary Examiner—Hezron E. Williams
Assistant Examiner—George Dombroske
Attorney, Agent, or Firm—Poms, Smith, Lande & Rose

[57] ABSTRACT

A method and apparatus for controlling a robot to simulate driving of a motor vehicle while the vehicle is actually on a chassis dynamometer includes provision for quickly, automatically, and accurately determining an accelerator gain factor to be used by the robot in actuating the accelerator of the motor vehicle to achieve predetermined vehicle speeds and accelerations. As a result, the simulated driving of the motor vehicle can be achieved so that the vehicle may be tested according to a predetermined travel pattern. To determine the accelerator gain, a proportional gain is determined on the basis of differences in incremental accelerator openings and resulting accelerations's while the motor vehicle is in a selected transmission gear. A product of the gain multiplied by a coefficient based on the various transmission ratios available is used as the accelerator gain dependent upon the particular transmission ratio selected during a test sequence.

14 Claims, 3 Drawing Sheets

APPARATUS AND METHOD OF CONTROLLING A ROBOT TO AUTOMATICALLY SIMULATE DRIVING OF A MOTORCAR

BACKGROUND OF THE INVENTION

1. Field of the Invention

The present invention relates to an apparatus and method of controlling a robot for automatically driving a motorcar in a simulation of car travel in which a driving wheel of the car is placed on a roller of a chassis dynamometer. With the car on the chassis dynamometer, dynamic performance tests of the motorcar can be conducted within a room.

2. Description of the Prior Art

A simulation of actual car travel driving by means of a chassis dynamometer has been used for dynamic performance testing of motorcars. Recently a motorcar driving robot (hereinafter referred to as a robot) adapted to individually drive a plurality of actuators by use of, for example, oil pressure, air pressure, DC servo motors, and the like, conducting stepping operations of an accelerator pedal, brake pedal, clutch pedal and the like of the automobile, as well as changeovers of a shift lever, has been used in such simulations of actual car travel driving. Thus, when car travel is referred to herein, the reader will understand that operation of the car on a chassis dynamometer is referred to, and not actual travel of the car as on a roadway.

However, in order to conduct a simulated driving in an appointed travelling pattern of the motorcar by means of such a robot, it is required to suitably choose a gain of an accelerator-controlling system (hereinafter referred to as an accelerator gain). But, disadvantages occur in that an oscillation is produced in signals in such a controlling system to make stabilized driving impossible if the accelerator gain is set at too high of a value. On the other hand, an aim of the appointed motorcar travelling pattern cannot be achieved if the accelerator gain is set at a lower value.

Further, with conventional automobile driving simulation robots accelerations and decelerations of the automobile under test have been repeated to observe the stability of response characteristics in the case where the accelerator gain is changed, thus determining the optimum accelerator gain for every gear-shift position (for example a first gearshift position, a second gearshift position and the like) by the trial and error method.

However, according to the above described conventional controlling method, disadvantages have occurred in that it requires great skill to determine the accelerator gain, so that not only a considerably long time is required for obtaining the optimum accelerator gain but also an individual difference is produced in the obtained accelerator gain. That is, the accuracy and repeatability of the test results are affected by the skill of the person determining the accelerator gain.

SUMMARY OF THE INVENTION

The present invention has been achieved paying attention to the above described matters and it is an object of the present invention to provide a method and an apparatus for practicing the method for controlling a robot capable of automatically determining an accelerator gain in a driving simulator for an automotive vehicle by means of such robot with high accuracy. The invention allows certainty in conducting a simulated driving of a motorcar to be tested in that the desired operations of the motorcar will be faithfully conducted by the robot.

In order to achieve the above described object, in the method of controlling a robot according to the present invention, a proportional gain (hereinafter sometimes referred to as a "P" gain) is determined on the basis of degrees of opening of a throttle and resulting accelerations during the time when said motorcar is travelled at the same one gear-shift position under different travelling conditions. A product of the obtained P gain multiplied by a coefficient based on a transmission ratio of the motorcar is used as a gain of the accelerator control.

In this case, the P gain may be determined on the basis of a difference between a position of the accelerator required for a simulated constant-speed travel at the same one gear-shift position, and that accelerator position required for generating a constant acceleration or accelerations during the time when the motorcar is travelled at the same one gear-shift position and with different degrees of opening of the throttle. That is, this comparison may be used to determine the P gain on the basis of a difference in degree of accelerator openings and differences in resulting accelerations.

According to the above described controlling method, the accelerator gain can be automatically determined in a short time without requiring great skill. And, since the accelerator gain is determined in relation to the transmission ratio, the simulated driving of the motorcar to be tested can be also surely conducted in the other transmission gears of the car.

DETAILED DESCRIPTION OF THE PREFERRED EMBODIMENTS

The preferred embodiments of the present invention will be below described with reference to the drawings.

Figure 1:
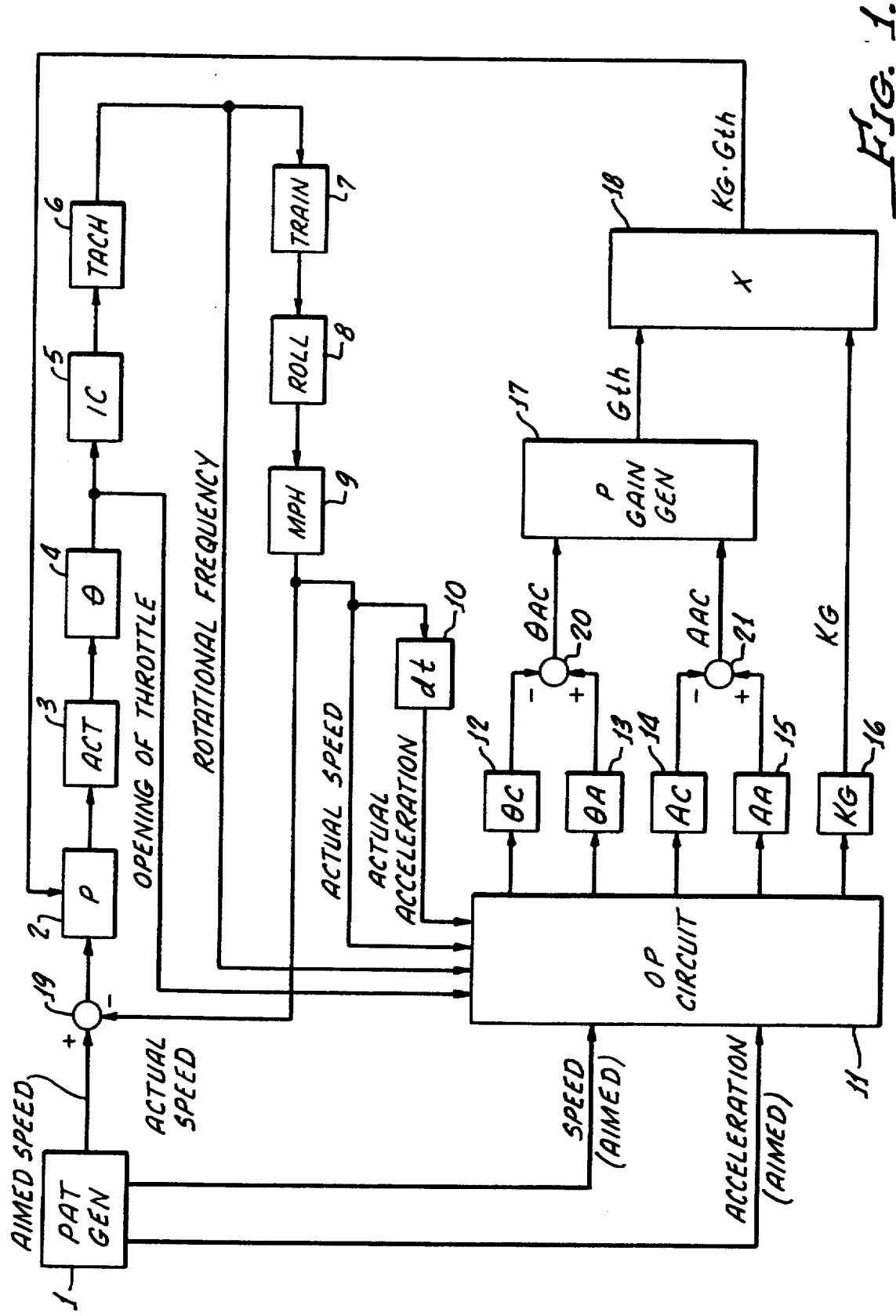
FIG. 1 is a block diagram showing a construction of an accelerator-controlling system for describing a method of controlling a motorcar driving robot according to the present invention.

FIG. 1 is a block diagram schematically showing a construction of an accelerator-controlling system according to one preferred embodiment of the present invention. Referring to FIG. 1, reference numeral 1 designates an aimed speed pattern generator generating a traveling pattern (changes of speed and acceleration) for simulated driving of a motorcar to be tested (not shown).

Reference numeral 2 designates a throttle-controlling system putting out a control signal obtained by multiplying a difference between an aimed speed from said aimed speed pattern generator 1 and an actual speed of the motorcar measured by means of a speed meter 9 by a gain (accelerator gain) of certain magnitude. That is to say, the throttle-controlling system 2 conducts a so-called P (proportional) control.

Reference numeral 3 designates a throttle actuator effecting a degree of opening of a throttle (not shown) on the basis of the control signal from the throttle—controlling system 2. Reference numeral 4 designates a throttle degree-of-opening meter, while reference numeral 5 designates an engine, reference numeral 6 designates an engine speed meter (tachometer), reference numeral 7 designates a power train of the automobile under test, and reference numeral 8 designates a roller of chassis dynamometer, reference numeral 9 designates a motorcar speed meter, and reference numeral 10 designates a differentiator differentiating the speed of the motorcar speed meter 9 to calculate acceleration.

Reference numeral 11 designates an operating circuit at which are received signals representing the aimed speed from the aimed speed pattern generator 1, and an aimed acceleration, the degree of opening of the throttle from the throttle degree-of-opening meter 4, a rotational frequency of engine 5 from the engine speed meter 6, the actual speed of the motorcar from speed meter 9, and the acceleration from the differentiator 10, respectively.

Reference numeral 12 designates a memory for cruising travel degree of throttle opening. This memory memorizes the degree of opening of the throttle $\theta c$ during the time when the motorcar is travelled at an appointed constant speed (cruising travel). Reference numeral 13 designates a memory for accelerating travel. This memory memorizes the degree of throttle opening $\theta_A$ during the time when the motorcar is accelerated. Reference numeral 14 designates a memory for cruising travel acceleration. This memory memorizes the acceleration $A_C$ during the cruising travel of the motorcar (in this case, zero), and reference numeral 15 designates a memory for an accelerating travel of the motorcar. This memory memorizes the acceleration $A_C$ during the time when the motorcar is accelerated.

Reference numeral 16 designates a transmission ratio memory memorizing not only transmission ratios at the respective gear-shift positions but also specific transmission ratios ($k_G$) as ratios of the transmission ratio of a selected or standard gear to the ratios of the other gears of the transmission. Provided that for example the transmission ratio of every gear is $r_1$, $r_2$, $r_3$, $r_4$, $r_5$ in turn from a first gear, and the standard gear is a second gear, then the relationships: $k_1 = r_1/r_2$, $k_2 = 1$, $k_3 = r_3/r_2$, $k_4 = r_4/r_2$ and $k_5 = r_5/r_2$, hold good.

Reference numeral 17 designates a P (proportional) gain generator, in which a difference $\theta_{AC}$ between the degree of opening of the throttle $\theta_A$ put out from the accelerating travel degree-of-opening memory 13 and the degree of opening of the throttle $\theta_C$ put out from the cruising travel degree of opening memory 12 (a difference between the degree of throttle opening during cruising travel and the degree of throttle opening during accelerating travel), along with a difference $A_{AC}$ between the acceleration $A_A$ put out from said accelerating travel memory 15 and the acceleration $A_C$ put out from the cruising travel acceleration memory 14 [a difference between the acceleration during cruising travel (in this case, zero) and the acceleration during the accelerating travel] are put to conduct an appointed comparison operation by the use of $\theta_{AC}$ $A_{AC}$ whereby obtaining said P gain $G_{th}$.

Reference numeral 18 designates a gear-shift gain generator adapted to put out a signal $k_G \cdot G_{th}$ (this is the accelerator gain) on the basis of the specific transmission ratios $k_G$ put out from the transmission ratio memory 16 and the P gain $G_{th}$ put out from the P gain generator 17. This accelerator gain $k_G \cdot G_{th}$ is put into the throttle-controlling system 2. In addition, reference numerals 19, 20, 21 designate butt points or summing junctions.

Next, an operation of the accelerator-controlling system having the above described construction will be described.

The aimed speed having the appointed speed and acceleration is generated by means of the aimed speed pattern generator 1 so that the aimed speed of the motorcar may be realized by the throttle-controlling system 2. And, the degree of opening of the throttle $\theta c$ and the acceleration Ac ($=0$) during the time when the motorcar is cruising in one gear-shift position with keeping of a constant speed is memorized in the cruising travel degree-of-opening memory 12 and the cruising travel acceleration memory 14, respectively. In addition, the degree of opening $\theta_{AC}$, and the resulting acceleration $A_{AC}$ during the time when the motorcar is accelerated at constant acceleration is memorized in the accelerating travel degree-of-opening memory 13 and the accelerating travel acceleration memory 15, respectively.

Further, the difference $\theta_{AC}$ between the degree of opening of the throttle during the cruising travel and the degree of opening of the throttle during the accelerating travel is obtained while the difference $A_{AC}$, between the acceleration during the cruising travel and the acceleration during the accelerating travel is obtained on the basis of the accelerations $A_A$ Ac. These differences $\theta_{AC}$, $A_{AC}$ are put in the P gain generator 17. In this P gain generator 17, the appointed operation is conducted to put out the P gain $G_{th}$ represented by a quantity of $K_1 \times \theta_{AC}/A_{AC} + K_2$ (wherein $K_1$, and $K_2$ are each a constant, respectively). And, this P gain $G_{th}$ is put in the gain generator 18 which considers the gear in which the motorcar is operated.

On the other hand, the transmission ratio of each gear at each gear-shift position can be determined from the rotational frequency of the engine and a revolving speed of the chassis dynamometer roller 8 during the travel at constant speed, so that these ratios are memorized in the transmission ratio memory 16 and the specific transmission ratio $K_G$ is put out from the transmission ratio memory 16 to be put in the gain generator 18 with regard to these transmission ratios.

Accordingly, in the gear-shift position-regarding gain generator 18, the P gain $G_{th}$ is multiplied by the specific transmission ratio $K_G$ to obtain the accelerator gain $K_G \cdot G_{th}$ at a certain position. The accelerator gain $K_G \cdot G_{th}$ is put in the throttle-controlling system 2 to be multiplied by a difference between the aimed speed from the aimed speed pattern generator 1 and the actual speed of the motorcar measured by the motorcar speed meter 9, whereby the product is used for the appointed control.

In the above described preferred embodiment of FIG. 1, the P gain $G_{th}$ is obtained on the basis of the difference $\theta_{AC}$ between the degree of opening of the throttle $\theta c$ during the time of cruising travel and the degree of opening $\theta_A$ during the accelerating travel conducted at the one selected gear-shift position, along with the difference $A_{AC}$ between the acceleration Ac ($-0$) during the cruising travel and the acceleration during the accelerating travel. However, the P gain $G_{th}$ may also be determined on the basis of the difference in the degree of opening of the throttle and the difference in acceleration during the time when the accelerating travel is conducted at two different acceleration levels, and with the motorcar in the same one gear-shift position.

Figure 2:
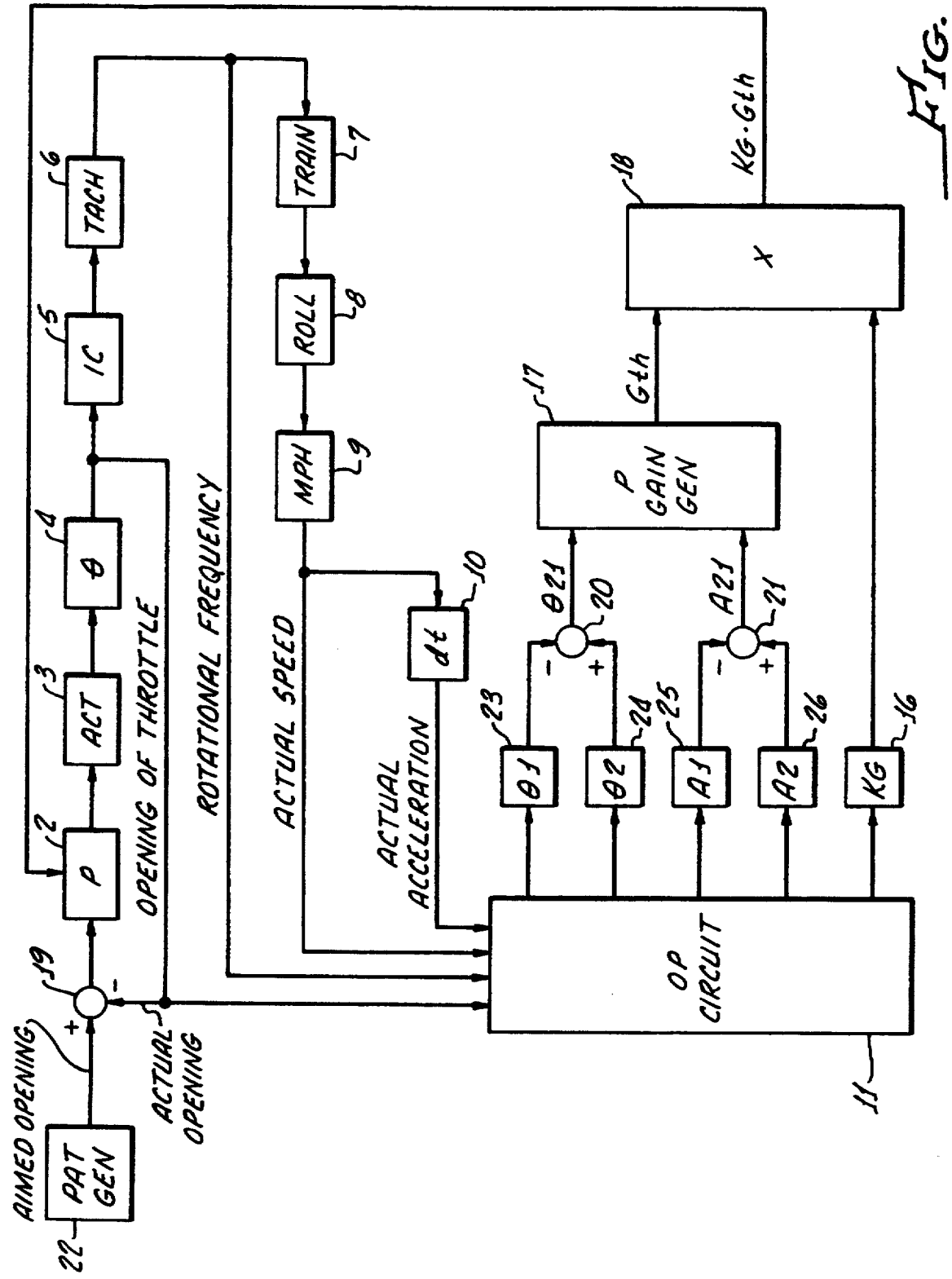
FIG. 2 is a block diagram showing a construction of an accelerator-controlling system according to another preferred embodiment of the present invention.

That is to say, referring to FIG. 2, reference numeral 22 designates a generator of a pattern of an aimed degree of throttle opening, reference numeral 23 designates a first accelerating travel degree-of-opening memory memorizing a degree of opening of the throttle $\theta_1$ during the first accelerating travel, and reference numeral 24 designates a second accelerating travel degree-of-opening memory memorizing a degree of opening of the throttle $\theta_2$ during a second accelerating travel. Reference numeral 25 designates a first accelerating travel acceleration memory memorizing the acceleration $A_1$ during the first accelerating travel, and reference numeral 26 designates a second accelerating travel acceleration memory memorizing the acceleration $A_2$ during the second accelerating travel. Other constituent members are same as those shown in FIG. 1.

The P gain $G_{th}$ amounts to $K_3 \times \Theta_{21}/A_{21} + K_4$ (wherein both $k_3$ and $k_4$ are a constant, respectively) in this preferred embodiment. It is the same as in the above described preferred embodiment that the product of this P gain $G_{th}$ by the specific transmission ratio $K_G$ is the accelerator gain $k_G$. $G_{th}$ at a certain gear-shift position. And, according to this preferred embodiment, the control adapted to the actual driving better can be achieved.

Although the P gain $G_{th}$ was multiplied by the specific transmission ratio $K_G$ in the preferred embodiments shown in FIGS. 1 and 2, the present invention is not limited by this. Instead, the accelerator gain may be individually determined for every gear.

Figure 3:
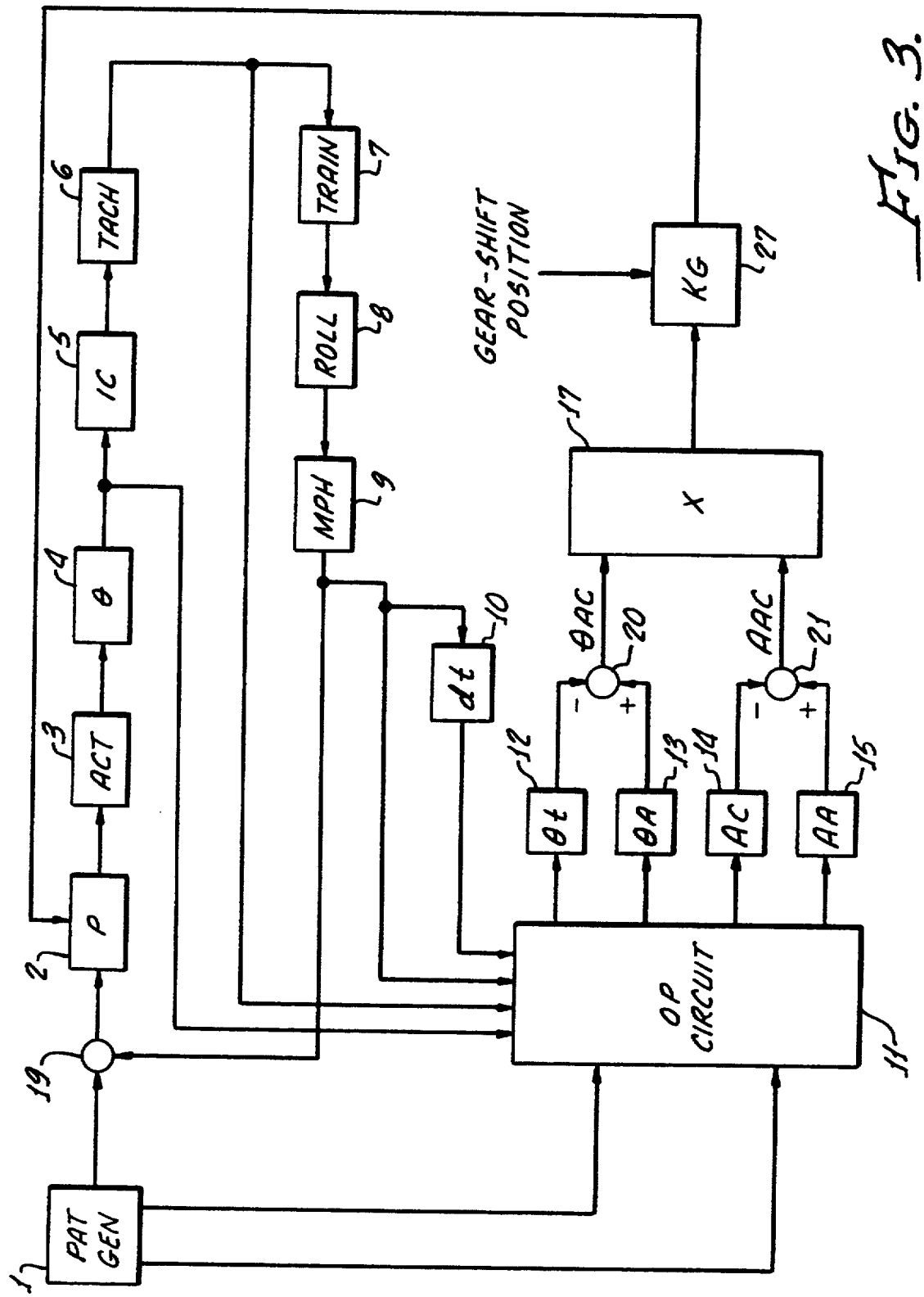
FIG. 3 is a block diagram showing a construction of an accelerator-controlling system according to a further preferred embodiment of the present invention.

That is to say, FIG. 3 shows an example of a construction in such the case where the accelerator gain is determined for every gear. In FIG. 3, a construction which is similar to that shown in FIG. 1 is depicted, but is transformed as described below. The same reference numerals as those used in describing the embodiment of FIG. 1 show the same elements in the embodiment of FIG. 3, so that their description is omitted.

In the preferred embodiment shown in FIG. 3, a P gain setter 27 is provided on the output side of the P gain generator 17 and the gear-shift position signal is put in this P gain setter 27. In such case, the accelerator gain can be determined for every gear-shift position in the same manner as in the above-described preferred embodiments.

In addition, it goes without saying that the P gain setter 27 may be provided on the output side of the P gain generator 17 and the gear-shift position signal may be put in the P gain setter 27 also in the preferred embodiment shown in FIG. 2.

As above described, according to the present invention, the accelerator gain in the simulated driving of a motorcar by the robot can be simply, automatically, and accurately determined without a high level of skill being required, and without individual differences. Accordingly, the controlling system can be suitably regulated, so that the simulated driving of the motorcar to be tested can be surely achieved. And, the degree of opening of the throttle during the cruising travel and during the accelerating simulated travel of the motorcar can be automatically learned by the robot.

What is claimed is:

1. A method of controlling a robot for simulating driving of a motorcar having an engine with a variable-position throttle and a change-speed transmission connecting said engine to a driving road wheel of said motorcar, said robot to control said throttle, said method including the steps of:

operating said motorcar at a first selected indicated road speed and first rate of acceleration with said change-speed transmission in a selected gear thereof and noting a first position of said throttle required to maintain said first speed and rate of acceleration;

operating said motorcar at a second selected indicated road speed and second rate of acceleration with said change-speed transmission in said selected gear thereof and noting a second position of said throttle which is required to maintain said second speed and rate of acceleration:

taking as a first difference value the difference between said second and said first throttle positions, and taking as a second difference value the difference between said second rate of acceleration and said first rate of acceleration;

comparing said first and second difference values to determine a gain value: and using said gain value to control positioning of said throttle by said robot.

2. The method of claim 1 including using a zero value of acceleration as said first rate of acceleration so that said motorcar maintains a constant indicated road speed to determine said first throttle position.

3. The method of claim 1 further including the further steps of similarly determining a respective gain value for said robot for another gear of said change speed transmission.

4. The method of claim 3 further including the steps of providing a gain setter having a gain multiplier value corresponding to at least one gear of said change-speed transmission, and multiplying said gain value by said multiplier value to obtain a gain product value for use as a gain signal of said robot.

5. The method of claim 4 further including the steps of providing a respective gain multiplier value corresponding to each gear of said change-speed transmission, and multiplying said multiplier values by said gain values to obtain respective gain product values for use as respective gain signals of said robot dependent upon the gear of said transmission which is selected.

6. The method of claim 3 further including the steps of similarly determining a respective gain value for said robot for each gear of said change speed transmission.

7. The method of claim 1 further including the steps of obtaining a gain product value by multiplying said gain value by a coefficient based on a transmission ratio of said change-speed transmission, and using said gain product value as a gain value of said robot to position said throttle.

8. The method of claim 7 further including the steps of calculating a coefficient ratio for a chosen gear of said change-speed transmission by taking a ratio of the gear ratio of said chosen gear to the gear ratio of said selected gear of said transmission, and using said coefficient ratio as said coefficient to calculate said gain product value for the chosen gear of said change-speed transmission.

9. The method of claim 1 wherein said comparison step includes selecting first and second constants, multiplying said first constant by the ratio of said first and second difference values, and adding said second constant.

10. A method of controlling a robot to simulate driving of a motorcar, the robot controlling a throttle of the motorcar, said method including the steps of: while the motorcar is in a selected gear accelerating the motorcar at differing rates of acceleration and noting the throttle positions required to achieve each rate of acceleration, determining a proportional gain on the basis of the differences in degree of opening of said throttle and the differences in acceleration, and using as a gain of the robot a product of the obtained proportionate gain multiplied by a coefficient based on a transmission ratio of the motorcar.

11. Apparatus for controlling the throttle position of a motorcar to simulate driving of the motorcar, said apparatus including;

a controller providing an output signal indicative of a chosen traveling pattern for said motorcar;

a throttle position actuator positioning said motorcar throttle in response to said output signal;

an operating circuit receiving an indication of said throttle position of said motorcar, of the speed of operation of an engine of said motorcar, of the indicated road speed of said motorcar, and of the rate of acceleration of said motorcar;

first and second memories providing a first difference signal indicative of the difference in throttle positions of said motorcar to operate at respective first and second speeds and rates of acceleration;

third and forth memories providing a second difference signal indicative of the difference in said first and second rates of acceleration;

a proportional gain generator providing a gain signal in response to said first and second difference signals; and a multiplier multiplying said gain signal by a value indicative of a transmission gear ratio of said motorcar to provide a gain product value which is used by said throttle position actuator as a correction value in setting said throttle position.

12. The apparatus of claim 11 wherein said proportional gain generator further includes means for multiplying a first constant by the ratio of said first and second difference signals, and adding a second constant.

13. The apparatus of claim 11 further including a fifth memory storing respective values indicative of the available gear ratios of a change-speed transmission of said motorcar.

14. The apparatus of claim 13 wherein said value indicative of a transmission gear ratio of said motorcar is a ratio between the gear ratio of a selected gear of said change-speed transmission and the gear ratio of another gear of said change-speed transmission.

* * * * *